Feb. 26, 1963   G. P. GIBSON ET AL   3,079,524
PROTECTOR FOR DYNAMOELECTRIC MACHINES
Original Filed Jan. 20, 1958   3 Sheets-Sheet 1

INVENTORS
Gordon P. Gibson &
Joseph G. Schwarckopf
BY *E. H. Liss*
ATTORNEY

# United States Patent Office 3,079,524
Patented Feb. 26, 1963

3,079,524
PROTECTOR FOR DYNAMOELECTRIC MACHINES
Gordon P. Gibson, Orchard Park, and Joseph G. Schwarckopf, Eggertsville, N.Y., assignors to Westinghouse Electric Corporation, East Pittsburgh, Pa., a corporation of Pennsylvania
Continuation of application Ser. No. 710,111, Jan. 20, 1958. This application May 1, 1961, Ser. No. 106,842
12 Claims. (Cl. 318—473)

The present invention relates to over-temperature protection for dynamoelectric machines, and more particularly to inherent thermal protection of dynamoelectric machines wherein the over-temperature detecting means is adapted to be embedded directly in the winding.

This application is a continuation of our prior application Serial No. 710,111, filed January 20, 1958, now abandoned.

Dynamoelectric machines have usually been protected against overheating by means of thermal overload relays having a thermally responsive element, usually a bimetallic element, heated either directly by the current of the protected machine, or by a heater carrying the current, so that the relay responds solely to the current. Relays of this type do not give entirely satisfactory or adequate protection, however, since the relay responds only to the current, and the thermal characteristics of the relay do not, and obviously cannot, match those of the motor, so that the thermal response of the relay differs from that of the motor. Thus, the relay is affected differently from the motor by changes in the ambient temperature, and the response of the relay may also be affected by heat from other adjacent devices, or by air currents and similar conditions which do not affect the motor.

At present, nearly all overload relays have the same defect. They are designed to give an action in response to a signal generated as a result of some phenomenon occurring outside the motor they are supposed to protect. Some development work has been carried out to modify existing types of overload relays in an attempt to offer adequate overload protection. In all motor installations a major problem is to prevent internal damage to the winding due to excessive heat. Therefore, it is desired to provide an inherent overload device that will be activated by the heat of the motor winding.

Inherent thermal protection has been developed which comprises a tube containing an expansible, vaporizable liquid and is arranged to be heated by direct conduction of heat from the machine windings. This type of relay which responds directly to the motor temperature may not operate rapidly enough to follow the temperature as closely as desired. Furthermore, the physical structure is such that temperature detecting means cannot be located precisely at the desired area in the windings.

The known relays, therefore, are not satisfactory since it is not possible to obtain sufficiently close protection and in some circumstances the relay will operate when the motor is still below the maximum safe temperature, so that it is unnecessarily stopped, while under other circumstances, the relay may allow the motor to become overheated before it operates.

The principal object of the present invention is to provide inherent thermal protection for dynamoelectric machines which is rapid, accurate in operation, fail safe, and which uses a relatively simple and inexpensive thermally responsive device.

It is an object of the invention to provide electrical apparatus with thermal protection using a thermistor having a small change in resistance with changes in normal temperatures and a large change in resistance for a relatively small change in temperature when abnormal temperatures are encountered. This has the advantage that sensitive and expensive control devices are not required to operate in response to the change in resistance, and a simple inexpensive control relay may be used. Preferably, the thermistor is of the positive temperature coefficient type since this gives advantages in providing a fail safe control circuit.

Another object of the invention is to provide inherent thermal protection for dynamoelectric machines using a relatively simple and inexpensive thermally responsive device which is rapid and accurate in operation, fail safe, and which is operated by direct conduction of heat from the winding to be protected.

A further object of the invention is to provide inherent thermal protection for dynamoelectric machines comprising a temperature sensitive resistance element which is embedded directly in the machine windings and is heated by direct conduction of heat from the windings.

Other objects and advantages of the invention will be apparent from the following detailed description taken in connection with the accompanying drawings, in which.

Figure 1:
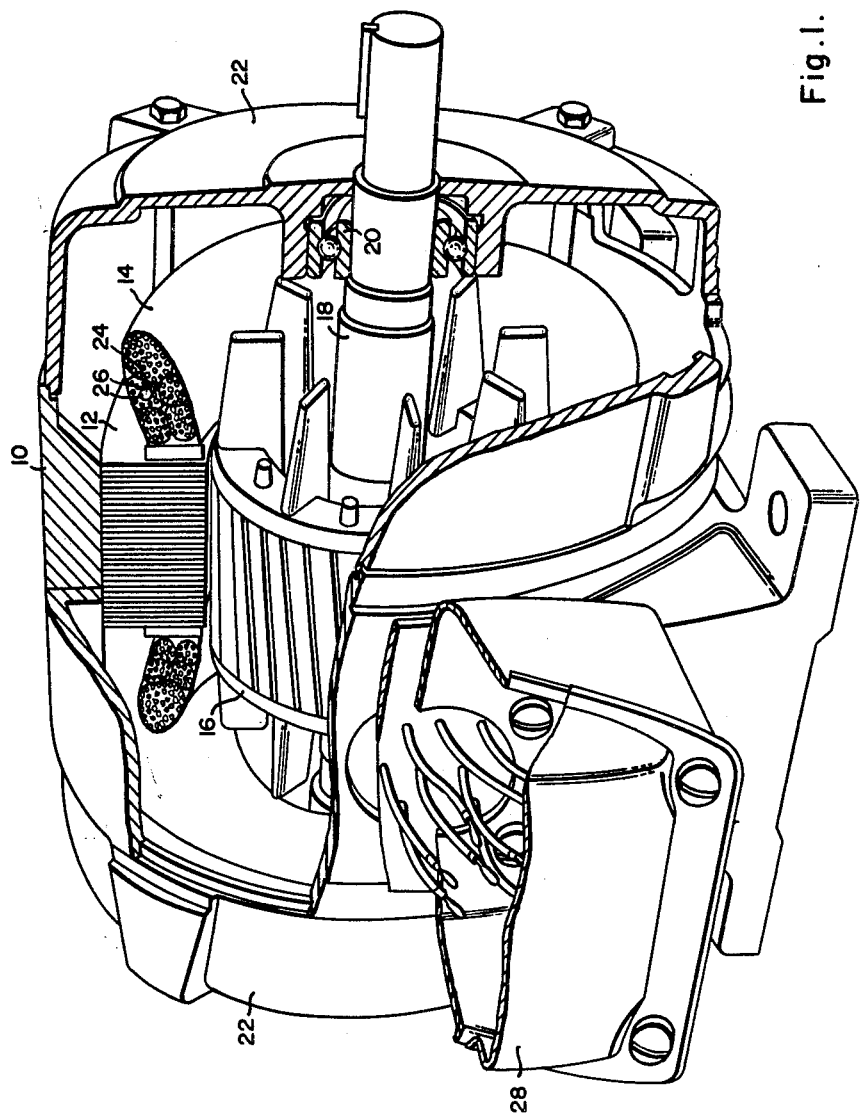
FIGURE 1 is a perspective view, partly broken away, showing a thermally protected machine.

FIG. 1 shows a thermally protected electric motor embodying the invention. An alternating current induction motor has been shown for the purpose of illustration, but it will be understood that the protective means is generally applicable to dynamoelectric machines of any type. The motor shown in FIG. 1 includes a frame structure 10 in which is supported a stator core 12 with windings 14 disposed in slots in the core in the usual manner, with the end turns of the windings extending beyond the core. The motor also has a rotor 16 mounted on a shaft 18 supported for rotation in bearings 20 carried in suitable end brackets 22. Shown embedded in the end extension of winding 14 is a temperature responsive resistance element 24 having a pair of leads 26 which may be brought out to junction box 28 if desired for connection with the remainder of the protective circuit. The resistance element 24 is a heat sensitive semiconductor device which changes its resistance rapidly with change in temperature. It may have a negative temperature coefficient of resistance, such that its resistance decreases cumulatively 5% for each 1° C. rise in temperature. Thus, when such a thermistor is mounted in the windings of a motor, its resistance will decrease as the winding temperature increases and it can be incorporated in a control circuit, such that at a given excessive temperature of the motor windings, it will cause the contactor to open through which power is supplied to the motor, thus protecting the motor. The control can be made so that the motor will cycle and start up again when the temperature has dropped to a predetermined safe value, or it can be made to lock out the circuit requiring manual restarting. However, it is deemed preferable that the temperature sensitive resistance element be a semiconductor device which has a positive coefficient of resistance, such that its resistance increases rapidly with rise in temperature. The modifications shown in FIGS. 2 and 3 incorporate a thermistor having a negative temperature coefficient of resistance. The modification shown in FIGS. 4 and 5 incorporates a resistor having a large positive temperature coefficient of resistance. The FIG. 5 embodiment is designed to automatically reset when the temperature drops to normal operating temperature.

Thermistors and other thermal sensitive resistance elements are built in various sizes, but the ones that are preferred for use in this invention are of the order of .25 inch diameter and .0625 inch in length with a small size lead wire brought out at each end. Being so very small, these resistors can easily be located in the windings of a motor, so that they can fairly closely follow the temperature cycle of the copper with the heat being transmitted through the conductor insulation to the thermistor, and the conductor insulation also insulating the thermistor from the motor voltage.

Figure 2:
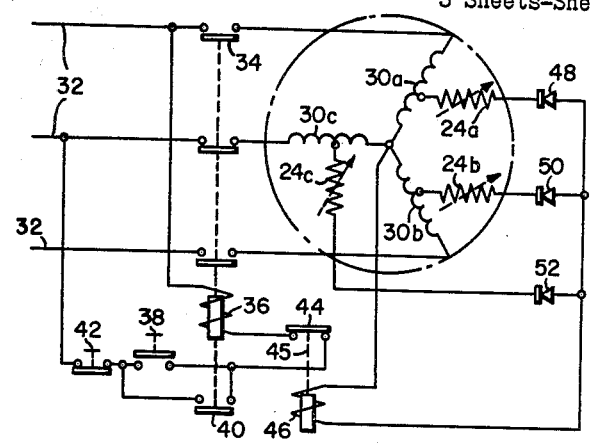
FIG. 2 is a schematic diagram showing the thermally responsive device connected to a three-phase motor.

FIG. 2 shows the manner in which one embodiment of the protective device is electrically connected for use in the stator windings of a three-phase induction motor. Thermistor device 24 comprises three individual thermistor units 24a, 24b and 24c connected in parallel. Each of the thermistor units is embedded in a phase winding of the motor as shown in FIG. 1, or otherwise mounted on the winding in close thermal relation thereto. This embodiment shows a three-phase motor having phase windings 30a, 30b and 30c connected to a three-phase line 32 by means of a contactor 34 of any suitable type. As shown in the drawing, the contactor 34 is actuated by a coil 36 connected across one phase of the line 32 and controlled by a start pushbutton 38 which energizes the coil 36. This closes the three-pole contactor 34, the contactor being held in by a sealing contact 40. The motor is stopped by actuation of the stop pushbutton 42 or by opening of a pair of contacts 44 of relay 45 the operation of which will be explained hereinafter. Either of these means interrupts the circuit of the coil 36 and allows the contactor 34 to open. Except for the contacts 44 this is a conventional line starter.

Contacts 44 of relay 45 are normally closed and are actuated to an open position by energization of the coil 46. Relay coil 46 is connected in a circuit made up of the three thermistors 24a, 24b and 24c, each connected in series with a small rectifier and connected to the stator winding to get a balanced three-phase power supply. Thermistor 24a is tapped into the phase winding 30a of the stator of the motor, thermistor 24b is tapped into the phase winding 30b and thermistor 24c is tapped into the phase winding 30c. The coil 46 is connected at one end to the rectifier 48, 50 and 52 and at its other end to the junction of the phase windings 30a, 30b and 30c. The thermistors are small as pointed out hereinabove and are embedded in the stator windings as shown at 24 in FIG. 1. The resistance of the thermistors is selected so that it decreases upon heating to a value which permits sufficient current to flow to actuate the relay 45. Actuation of the relay 45 opens the line starter by deenergizing the coil 36. The line contactor 34 opens, removing power from the motor. Proper selection of thermistor resistance and relay coil turns makes it possible to secure protection against any desired temperature. The thermal capacity of the thermistors is so small that protection is secured against overheating from any cause including locked rotor, single phasing, overload, loss of cooling and excessive ambient temperature.

It will be seen that the motor will be stopped upon heating of the thermistors 24 to a predetermined maximum safe temperature by direct conduction of heat from the winding. Complete protection is obtained in this way under all conditions. Thus, heating due to an overload causes the winding temperature to rise and heat the thermistors 24 directly. Stalled or locked rotor conditions cause excessive currents and consequently excessive heating in the winding which heat is conducted to the thermistors and heats them rapidly enough to cause operation in time to protect the motor. Protection is also obtained against single-phase operation of the motor. Such operation may be caused by interruption of one of the lines 32 external to the motor which will result in the motor running as a single-phase motor with two of the phase windings in series across the remaining two lines with excessive current. Single-phase operation may also result from blowing of the fuse on the primary side of a three-phase transformer supplying the motor. Current will then flow through two of the phase windings in parallel and return through the third phase which will thus be carrying an excessive current and consequently overheat.

The thermistors in the embodiment illustrated in FIG. 2 preferably have a negative temperature coefficient of resistance; thus the resistance decreases with the increase of temperature in the thermistors. Because electrical energy for relay 45 in the protective scheme shown in FIG. 2 is supplied by tapping directly into the motor winding, it is necessary that the protective scheme be built into the motor during original assembly. It may be desirable under certain circumstances to provide a scheme which could be employed as an added feature in an existing motor. Such a scheme is shown in the embodiment illustrated in FIG. 3. The FIG. 3 embodiment again discloses the protective scheme employed in a three-phase motor. It will, of course, be understood that this protective scheme may be used in other types of dynamoelectric machines, if desired.

Figure 3:
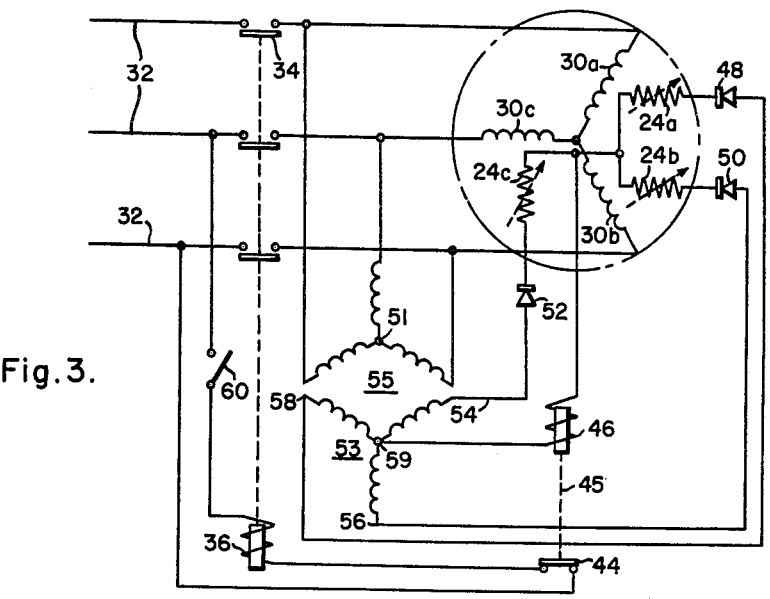
FIG. 3 is a schematic diagram showing another modification of the invention incorporated in a three-phase motor wherein the device has a different form of power supply than the FIG. 2 modification.

In the FIG. 3 embodiment, thermistors 24a, 24b and 24c are shown, each embedded in one phase winding 30a, 30b and 30c of the motor stator. In series with each of the thermistors 24a, 24b and 24c is a small rectifier 48, 50 and 52, respectively. The rectifiers are each connected to one terminal on the secondary 53 of a small three-phase transformer 55 as shown at 54, 56 and 58. The primary of the transformer is connected to line 32 on the motor side of contactor 34. At the end remote from the rectifiers 48, 50 and 52, thermistors 24a, 24b and 24c are connected together and to one side of actuating coil 46 of relay 45. At its other side coil 46 is connected to the neutral 59 of the secondary of transformer 55. Contacts 44 of relay 45 are normally closed; however, when the temperature of the motor windings, due to an excessive overload or due to trouble in the motor, rises to an unsafe value, the thermistors will also increase in temperature and decrease in resistance to a value that will let enough current flow through one or more of them to energize the relay coil and thus open its contacts. The contacts 44 of the relay 45 may be connected in the control circuit of a motor in any desired manner. As shown in the drawing, the contactor 34 is actuated by a coil 36 connected across one phase of the line 32 and controlled by a manual switch 60. The motor is started by closing the switch 60 which energizes the coil 36 and closes the contactor 34. The motor is stopped by opening of the switch 60 or by opening of the contacts 44 of the protective device disclosed, either of which interrupts the circuit of the coil 36 and allows contactor 34 to open. It will thus be seen that the motor will be stopped upon heating of the thermistors 24 to the predetermined maximum safe temperature by direct conduction of heat from the windings.

In certain applicataions it may be desirable to provide a protection circuit wherein if the relay coil, the thermistors or the power supply is not in the protective circuit, the motor will not start. This may be considered a fail-safe type of protection. In order to make a fail-safe device, the contact on the protective relay should be normally open and the power on the contactor coil only when this small relay is energized. This fail-safe feature is provided in the embodiment shown in FIG. 4.

Figure 4:
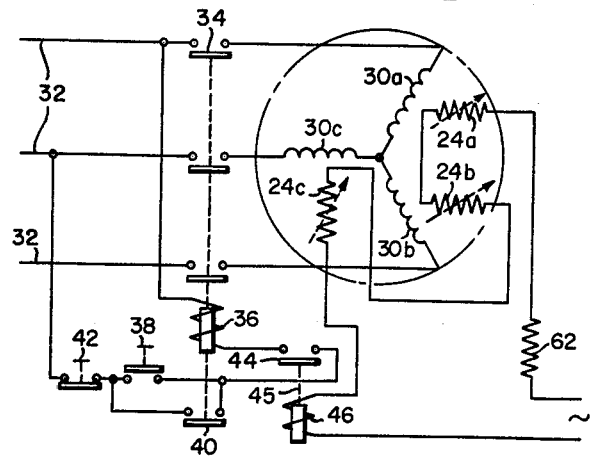
FIG. 4 is a similar diagram showing still another modification incorporating thermal sensitive resistance element having positive temperature coefficients of resistance.
Figure 6:
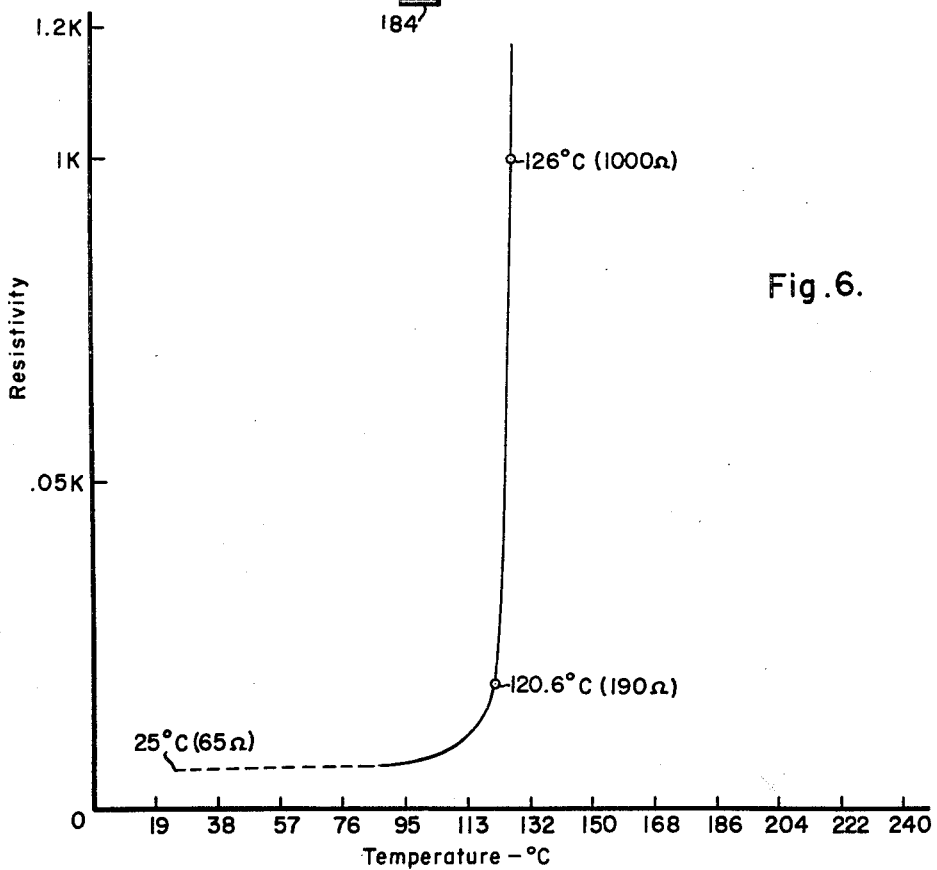
FIG. 6 is a typical temperature-resistance curve of the positive temperature coefficient thermal responsive resistance material utilized in one embodiment of this invention.

In the FIG. 4 embodiment, the protective scheme may either be built into the motor during original assembly or be provided on an existing motor or other dynamo-electric machine. The protective device of this invention is again shown for the purpose of illustration employed in a three-phase induction motor. Shown in the drawings is a three-phase stator having phase windings 30a, 30b and 30c, each having a thermal responsive resistor having a positive temperature coefficient of resistance 24a, 24b and 24c embedded therein, or otherwise mounted on the winding in close thermal relation thereto. The line starter shown in FIG. 4 is of the conventional type and is identical with the line starter disclosed in FIG. 2. This figure shows a three-phase motor having its phase windings 30a, 30b and 30c connected to a three-phase line 32 by means of a three-pole contactor 34 of any suitable type. In this embodiment of the invention the resistance elements 24a, 24b and 24c have a positive temperature coefficient of resistance. Suitable temperature sensitive resistance elements having a high positive temperature coefficient of resistance are more fully described in copending application Serial No. 717,191, filed February 24, 1958 by Y. Ichikawa and assigned to the Westinghouse Electric Corporation, now Patent No. 2,976,505, issued March 21, 1961, and are composed of the semi-conductor materials barium titanate, barium strontium titanate and barium lead titanate with impurity additions of either yttrium or cerium. By varying the proportions of these elements in the composition, a wide range of temperature-resistivity values can be obtained to provide any desired operating point. Other suitable compositions having the desired characteristics may of course be used. A typical example of the temperature-resistance characteristic of a suitable composition is illustrated in the curve of FIG. 6, where the resistance of a sample of suitable size in 65 ohms at 25° C. (normal room temperature) and 1000 ohms at 126°. As can be seen from the curve, the resistance is low and almost constant at low temperatures but rises very rapidly with rise in temperature after a critical operating temperature is reached. The resistance of the elements increases rapidly with increase in temperature. The resistance elements 24a, 24b and 24c are connected in series through a resistance 62 to a low voltage source of single-phase power.

It is preferable to connect resistance elements 24a, 24b and 24c in series when the resistance elements have a positive temperature coefficient of resistance in order to protect the motor when it single phases. Thus, if any one of the resistance elements 24a, 24b and 24c heats up to a predetermined temperature the resistance of the temperature sensing elements in series reaches a value effective to disconnect the motor from the line as will be hereinafter explained. When the temperature sensitive elements have a negative temperature coefficient of resistance, a drop in resistance is effective to disconnect the motor from the line as in FIGURE 2 and FIGURE 3. Therefore, in that case, protection against single phasing would be obtained when the thermistors are connected in parallel. At the opposite end, the thermistors are connected to another terminal of the single-phase source of power through the operating coil 46 of protective relay 45.

The contacts 44 of the relay 45 may be connected in the control circuit of the motor in any desired manner. As shown in the drawing, the contactor 34 is actuated by a coil 36 connected across one phase of the line 32 and controlled by a start pushbutton 38 and a stop pushbutton 42. The motor is started by momentarily closing the button 38 which energizes the coil 36 and closes the contactor 34, the contactor being held by a sealing contact 40. The motor is stopped by opening of the contact 44 or by actuation of the stop pushbutton 42, either of which interrupts the circuit of the coil 36 and allows the contactor 34 to open. The contacts 44 of relay 45 are normally open. At normal operating temperature, the resistance of the elements 24a, 24b and 24c is very low and sufficient current flows to energize the relay 45 and close the contact 44 to permit the contactor 34 to close and start the motor when the start button is pressed. The elements 24a, 24b and 24c are embedded in the windings, one in each phase. Upon overheating, the combined resistances of the thermistors increase rapidly causing the relay 45 to deenergize which, in turn, deenergizes the coil 36 and the line contactor opens, removing power from the motor. If, for some reason, the elements 24, or the relay coil 46, or the resistance 62, or the power supply is not in the protection circuit, the motor will not start. This may, therefore, be considered fail-safe. The resistor 62 is used to obtain the correct temperature of operation. This can be a fixed resistor of the correct value as shown or it may be adjustable. This temperature of operation is also regulated by the composition of the resistance material of elements 24.

Figure 5:
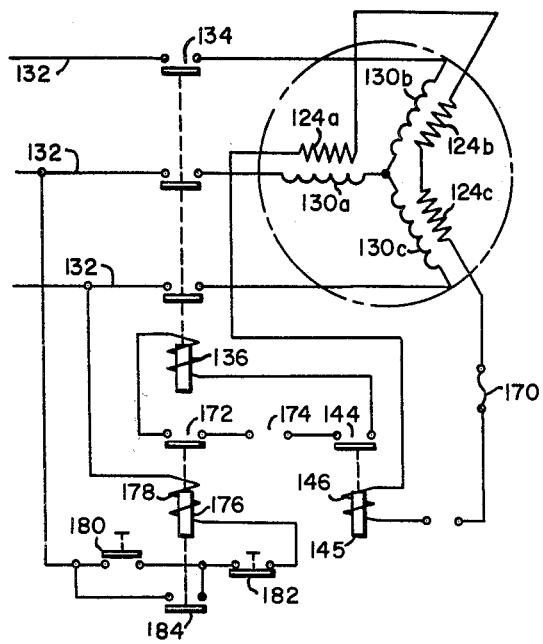
FIG. 5 is a schematic diagram showing still another modification of the invention which can reset automatically.

In FIG. 5 there is shown another embodiment of the invention which provides for automatic resetting when the temperature of the machine returns to normal and also a further fail-safe feature. A fuse 170 is placed in series with the resistance elements 124 which will blow when the elements 124 are short circuited thus opening contactor 144 to disconnect the motor from the line. The FIGURE 5 embodiment employs temperature sensitive resistance elements having a positive cofficient of resistances similar to FIG. 4.

For purposes of illustration, a three phase motor stator is shown having phase windings 130a, 130b and 130c. Each winding has embedded therein a thermal responsive resistance element 124a, 124b and 124c, respectively. These are identical to the temperature sensitive resistance elements of the FIGURE 4 embodiment. The resistance elements 124 are connected in series through relay coil 146 of relay 145 and a fuse 170 across a voltage source. Phase windings 130 are connected to a three phase alternating current line 132 by means of a three pole contactor 134 of any suitable type. Contactor 134 is actuated by a coil 136 which is in series with contacts 144 of relay 145 and contacts 172 of relay 176 and is connected to a voltage source 174. Contacts 172 are operated by relay coil 178. Relay 176 is part of a conventional line starter and is in series with a start pushbutton 180 and a stop pushbutton 182. A sealing contact 184 is connected across start pushbutton 180 and is actuated by energization of relay coil 176. Power may be supplied to relay coil 178 by one phase of line 132, as shown in the drawing.

Operation of the FIGURE 5 embodiment is as follows: At normal operating temperature of the motor and normal condition of the protective circuit, relay coil 146 is energized closing contacts 144. Start pushbutton 180 is pressed, momentarily, energizing coil 178. Energization of coil 178 closes contacts 172 and 184. Closing contacts 172 energizes coil 136 which in turn closes contacts 134 connecting the motor stator to line 132 and thus starting the motor. If the motor has been or should become overheated, resistance elements 124 will reach a high value of resistance, deenergizing coil 146 thereby opening contacts 144. This in turn deenergizes coil 136 permitting contactor 134 to open, disconnecting the motor from the line 132. Upon cooling, the resistance of resistance elements 124 will drop rapidly energizing coil 146 to reclose contacts 144, in turn reenergizing coil 136 to close contact 134. If the resistance element 124 should be short circuited, fuse 170 will blow resulting in opening of contacts 144 and disconnection of the motor from the line.

Thus, a fail safe protective system has been provided which will disconnect the motor from the line in case of overheating of the motor, shorts or opens in the protective circuit and which will automatically restart the motor when the overheated motor returns to normal temperature.

It should now be apparent that inherent thermal protection has been provided by means of a relatively simple and inexpensive thermally responsive relay which is applicable to any type of dynamoelectric machine including polyphase or single-phase motors, alternating current or direct current motors, or generators, or to any type of electrical device having current carrying windings which may be subject to overheating. Thermally responsive elements are readily applied to the windings and may be put in place before the final varnish impregnation and baking of the winding, if desired, so that the varnish helps to hold them in place and in good thermal relation with the windings. They may also be added as an additional feature to an existing motor.

In the arrangement shown in FIG. 2, when the machine windings are carrying current below a predetermined overload value, the thermistor 24 is relatively cool and offers a relatively high resistance to the flow of energizing current. This high resistance blocks the flow of energizing current through the electrical circuit including the winding of relay 45 and thermal responsive elements 24; however, when the windings carry current equal to or in excess of a predetermined overload current for said machine, the windings heat up and the resistance of the thermistor drops thereby allowing sufficient current to pass through the energizing winding of relay 45 to open the relay so as to disconnect the motor from an energizing source of power. In the arrangements shown in FIGS. 4 and 5, when the machine windings are carrying current below the predetermined overload value, each resistance element is relatively cool and offers a relatively low resistance to the flow of energizing current thereby allowing sufficient current to pass through the energizing winding of the protective relay which thus holds the protective contacts in closed position permitting the line starter to connect the motor to the source of power. When the windings carry current up to or in excess of the predetermined overload for said machines, the windings heat up and the resistance of the element rises rapidly; this high resistance blocks the flow of energizing current through the protective circuit, thus allowing the protective relay to open and thereby disconnecting the energizing coil of the line starter from the line.

Certain preferred embodiments of the invention have been shown and described for the purpose of illustration but since various other embodiments and modifications are possible within the scope of the invention, it is to be understood that the invention is not limited to the specific details or construction shown but in its broadest aspect it includes all equivalent embodiments and modifications.

We claim as our invention:

1. In a dynamoelectric machine having a current carrying winding, a protective system for preventing overtemperature of said winding comprising a plurality of temperature sensitive resistance elements connected in series embedded in said winding in close thermal relation thereto, said elements having a positive temperature coefficient of resistance, a protective relay, said protective relay having an operating coil in series with said resistance elements and a source of low voltage supply, normally open contacts for said protective relay, a main contactor operating coil in series with a voltage supply and said protective relay contacts, said temperature sensitive resistance elements each being of such value as to permit the flow of energizing current at normal operating temperatures and to block the flow of energizing current at a predetermined higher temperature whereby a rise in the temperature of said winding to said predetermined higher temperature is effective to deenergize said protective relay operating coil and drop out said protective relay contacts thereby deenergizing said main contactor operating coil to open said main contactor.

2. In a three-phase dynamoelectric machine having three-phase stator windings, a protective system for preventing overtemperature of said windings comprising a temperature sensitive resistance element having a positive temperature coefficient of resistance embedded in each phase of said windings in close thermal relation thereto, said resistance elements connected together in series, a protective relay, said protective relay having an operating coil in series with said resistance elements and a source of low voltage direct current supply, contacts for said protective relay, a main contactor actuated by a main contactor operating coil in series with a voltage supply and said protective relay contacts whereby a rise in temperature of any one or more of said windings to a predetermined value is effective to open the contacts of said protective relay thereby deenergizing said main contactor operating coil to open said main contactor.

3. In a dynamoelectric machine having current carrying windings, a protective system for preventing overtemperature of said windings comprising a plurality of temperature sensitive resistance elements having a high positive temperature coefficient of resistance embedded in said windings in close thermal relation thereto, said resistance elements connected in series, a first relay having an actuating coil in series with said resistance elements and a fuse element, a voltage source for said first relay actuating coil, a main contactor having an actuating coil for connecting said dynamoelectric machine to a voltage supply, a second voltage source for said contactor actuating coil, a starter relay having an actuating coil and contacts, said starter relay contacts and said first relay contacts being in series with said main contactor actuating coil.

4. In a dynamoelectric machine having current carrying windings, a protective system for preventing overtemperature of said windings comprising a plurality of temperature sensitive resistance elements connected in series, having a high positive temperature coefficient of resistance embedded in said windings in close thermal relation thereto, a first normally open relay having an actuating coil in series with said resistance elements and a fuse, a voltage supply for said first relay actuating coil, a main contactor having an actuating coil for connecting said dynamoelectric machine to a voltage supply, a second voltage source for said contactor actuating coil, a starter relay having an actuating coil and contacts, said starter relay contacts and said first relay contacts being in series with said main contactor actuating coil.

5. In a dynamoelectric machine having current carrying windings, a protective system for preventing overtemperature of said windings comprising a plurality of temperature sensitive resistance elements connected in series and embedded in said windings in close thermal relation thereto, each of said resistance elements having a positive temperature coefficient of resistance, a protective relay, said protective relay having an operating coil in series with said resistance elements and with a low voltage source, contacts for said protective relay, a main contactor having an operating coil in series with a voltage supply and said protective relay contacts whereby a rise in the temperature of said windings to a predetermined value is effective to open the contacts of said protective relay thereby deenergizing said main contactor operating coil to open said main contactor.

6. In a dynamoelectric machine having current carrying windings, a protective system for preventing overtemperature of said windings comprising a plurality of temperature sensitive resistance elements connected in series and mounted on said windings in close thermal relation thereto, said resistance elements having a positive temperature coefficient of resistance, a protective relay having an operating coil connected in an energizing circuit in series with said resistance elements, and means controlled by said protective relay for effecting deenergization of the dynamoelectric machine in response to effective deenergization of said operating coil.

7. In a dynamoelectric machine having current carrying windings, a protective system for preventing overtemperature of said windings comprising a plurality of temperature sensitive resistance elements connected in series and mounted on said windings in close thermal relation hereto, said resistance elements having low resistance at temperatures below a predetermined temperature and having a sharp increase in resistance and a high positive temperature coefficient of resistance at higher temperatures, a protective relay having an operating coil connected in an energizing circuit in series with said resistance elements, and means controlled by said protective relay for effecting deenergization of the dynamoelectric machine in response to effective deenergization of said operating coil.

8. In an electrical device having a plurality of current carrying windings, a plurality of temperature sensitive resistance elements connected together in series, one of said temperature sensitive elements being mounted on each of said windings in close thermal relation thereto, and means for connecting said temperature sensitive elements in an external circuit to control the current therein, said temperature sensitive elements having relatively low resistance and relatively small change in resistance below a predetermined temperature and having a sharp increase in resistance and a high positive temperature coefficient of resistance at temperatures above said predetermined temperature.

9. In an electrical device having a plurality of current carrying windings, a plurality of temperature sensitive resistance elements connected together in series, one of said temperature sensitive elements being mounted on each of said windings in close thermal relation thereto, and means for connecting said temperature sensitive elements in an external circuit to control the current therein, said external circuit including a device having an energized condition and a deenergized condition, said temperature sensitive elements having relatively low resistance and relatively small change in resistance below a predetermined temperature and having a sharp increase in resistance and a high positive temperature coefficient of resistance at temperatures above said predetermined temperature such that said device is caused to change from one of said conditions to the other when the temperature of any of the temperature sensitive elements exceeds said predetermined temperature.

10. In an electrical device having a plurality of current carrying windings, a plurality of temperature sensitive resistance elements connected together in series, one of said temperature sensitive elements being mounted on each of said windings in close thermal relation thereto, and means for connecting said temperature sensitive elements in an external circuit to control the current therein, said external circuit including energizing means and a current responsive device having an energized condition and a deenergized condition, said temperature sensitive elements having relatively low resistance and relatively small change in resistance below a predetermined temperature and having a sharp increase in resistance and a high positive temperature coefficient of resistance at temperatures above said predetermined temperature such that the current in said external circuit is sufficiently changed to cause said current responsive device to change from one of said conditions to the other when the temperature of any of the temperature sensitive elements exceeds said predetermined temperature.

11. In a dynamoelectric machine having a plurality of current carrying windings, a plurality of temperature sensitive resistance elements connected together in series, one of said temperature sensitive elements being mounted on each of said windings in close thermal relation thereto, means for connecting the temperature sensitive elements in an external control circuit to control the current therein, said control circuit including a relay and energizing means for the relay, said temperature sensitive elements having relatively low resistance below a predetermined temperature and having a sharp increase in resistance and a high positive temperature coefficient of resistance above said predetermined temperature such that said protective relay is energized when the temperature of the temperature sensitive elements is below said predetermined temperature and is effectively deenergized when the temperature of any of the temperature sensitive elements is above said temperature, and means for effecting deenergization of said dynamoelectric machine in response to deenergization of said relay.

12. In a polyphase dynamoelectric machine having a plurality of current carrying phase windings, a plurality of temperature sensitive resistance elements connected together in series, one of said temperature sensitive elements being mounted on each of said phase windings in close thermal relation thereto, means for connecting the temperature sensitive elements in an external control circuit to control the current therein, said control circuit including a relay and energizing means for the relay, said temperature sensitive elements having relatively low resistance below a predetermined temperature and having a sharp increase in resistance and a high positive temperature coefficient of resistance above said predetermined temperature such that said protective relay is energized when the temperature of the temperature sensitive elements is below said predetermined temperature and is effectively deenergized when the temperature of any of the temperature sensitive elements is above said temperature, control means for said dynamoelectric machine, and means for connecting said protective relay to effect operation of said control means to deenergize the dynamoelectric machine upon deenergization of the relay.

References Cited in the file of this patent

UNITED STATES PATENTS

| | | |
|---|---|---|
| 2,446,474 | Harrold | Aug. 3, 1948 |
| 2,463,935 | Fish et al. | Mar. 8, 1949 |
| 2,659,852 | Trevitt | Nov. 17, 1953 |
| 2,896,127 | Seely | July 21, 1959 |

FOREIGN PATENTS

| | | |
|---|---|---|
| 593,166 | Great Britain | Oct. 7, 1947 |
| 735,755 | Great Britain | Aug. 31, 1955 |
| 522,731 | Belgium | Sept. 30, 1953 |